April 4, 1967 W. T. RHOADES 3,312,870

ELECTRICAL TRANSMISSION SYSTEM

Filed March 13, 1964 2 Sheets-Sheet 1

INVENTOR.
WILLIAM T. RHOADES,
BY Noel B. Hammond
AGENT.

April 4, 1967 W. T. RHOADES 3,312,870

ELECTRICAL TRANSMISSION SYSTEM

Filed March 13, 1964 2 Sheets-Sheet 2

INVENTOR.
WILLIAM T. RHOADES,
BY Noel B. Hammond
AGENT.

3,312,870
ELECTRICAL TRANSMISSION SYSTEM
William T. Rhoades, Garden Grove, Calif., assignor to Hughes Aircraft Company, Culver City, Calif., a corporation of Delaware
Filed Mar. 13, 1964, Ser. No. 351,715
15 Claims. (Cl. 317—99)

The present invention relates to electrical transmission lines and connectors and, more particularly, to a transmission system having an extremely low characteristic impedance.

In some complex electronic equipment, such as computers for example, there may be many electronic circuits being switched off or on simultaneously, as when the switching is initiated by a clock pulse. Frequently, transient electrical fluctuations caused by the switching are transmitted throughout the system by the distribution lines which supply the direct current operating voltages to the individual circuits. These transient fluctuations may cause faulty operation of the equipment, a decrease of the speed with which it operates or necessitate more precise electrical tolerances on the circuit components. To reduce the effect of such transient fluctuations, it is common practice to use a well-regulated power supply connected to the individual circuits via heavy conductors or bus bars. However, it has been found that these measures are not sufficient to fully eliminate the troublesome effects of transient electrical fluctuations in modern, high-speed, sensitive electronic equipment. Due to the reactance of the transmission lines, they present a sufficiently high characteristic impedance that transient signals of sufficient amplitude to be troublesome are developed in, and transmitted by the transmission lines.

Another areas where the need exists for transmission lines and connectors having an extremely low characteristic impedance is in low-impedance transducers, such as ferro-electric transducers and in circuits employing cryogenically-cooled electronic components. Cryogenically-cooled circuits, utilizing components such as inductors, resistors, or capacitors cooled to the vicinity of absolute zero temperature, have an extremely low impedance. To obtain efficient power transfer, it is necessary to provide an impedance match between the transmission lines and the cryogenically-cooled circuits. This necessitates the use of transmission lines and connectors having an extremely low characteristic impedance of a particular value.

Accordingly, it is an object of the present invention to provide an electrical transmission system which minimizes the transmission of transient electrical fluctuations.

Another object of the invention is the provision of an electrical transmission system having an extremely low impedance.

In accordance with these and other objects of the invention, there is provided an electrical transmission line formed of three elongated conductive plates having insulated outer surfaces. The plates are arranged with their broad surfaces substantially coextensive, parallel and adjacent to form a laminated structure. The inner plate is used as the current path for conduction in one direction, and the return path is by way of the two outer plates in parallel. The two outer plates are electrically interconnected at intervals along the length of the transmission lines. A material having a high dielectric constant may be disposed between the plates. Due to the low reactance, the transmission line has a low characteristic impedance across which it is difficult for high amplitude transient electrical fluctuations to develop. The transmission of transient electrical fluctuations may be attenuated by disposing a lossy material between the plates. In this manner, a high attentuation can be obtained at selected frequencies or frequency bands. Terminals may be provided along the edge of the laminated transmission line structure, or a cylindrical connector may be inserted into a transverse hole provided in the laminated transmission line. The configuration of the connector is such as to permit contacting the appropriate plate or plates of the transmission line. In another embodiment of the invention, a primary transmission line distributes direct current to a plurality of circuit boards, and secondary transmission lines are incorporated into the circuit board structure for distributing the direct current to a plurality of circuits on the circuit board.

The following specification and the accompanying drawings describe and illustrate exemplary embodiments of the present invention. Consideration of the specification and the drawings will provide an understanding of the invention, including the novel features and objects thereof. Like reference characters denote like parts throughout the figures of the drawings.

In complex electronic equipment such as high speed electronic computers, for example, there are many individual electronic circuits. These circuits may be mounted on plug-in cards or printed circuit boards, and each of the individual circuits is supplied with direct current (D.C.) to operate the transistors, vacuum tubes, diodes, or other circuit elements. In the present example, a regulated power supply is connected to a plurality of electronic circuits by a power distribution system in accordance with the invention. The transmission lines have been made as long as 36 inches, although they may be longer or shorter as desired. The transmission lines pass near the terminals of a plurality of circuit boards. Each transmission line supplies on the order of 30 amperes at ten volts in the present example, when all of the circuits are drawing their maximum current. However, the current supplied by the transmission lines varies as the circuits are switched on and off. As the circuits are switched on and off, individually or in unison, transient electrical fluctuations are generated. These switching transients have the nature of high-frequency alternating current (A.C.) signals, due to their rapid build-up and decay. The A.C. characteristics of the transmission line are such as to minimize the transmission of transient electrical fluctuations, while the D.C. characteristics are such to provide optimum transmission of D.C.

Figures 1, 2, 3:
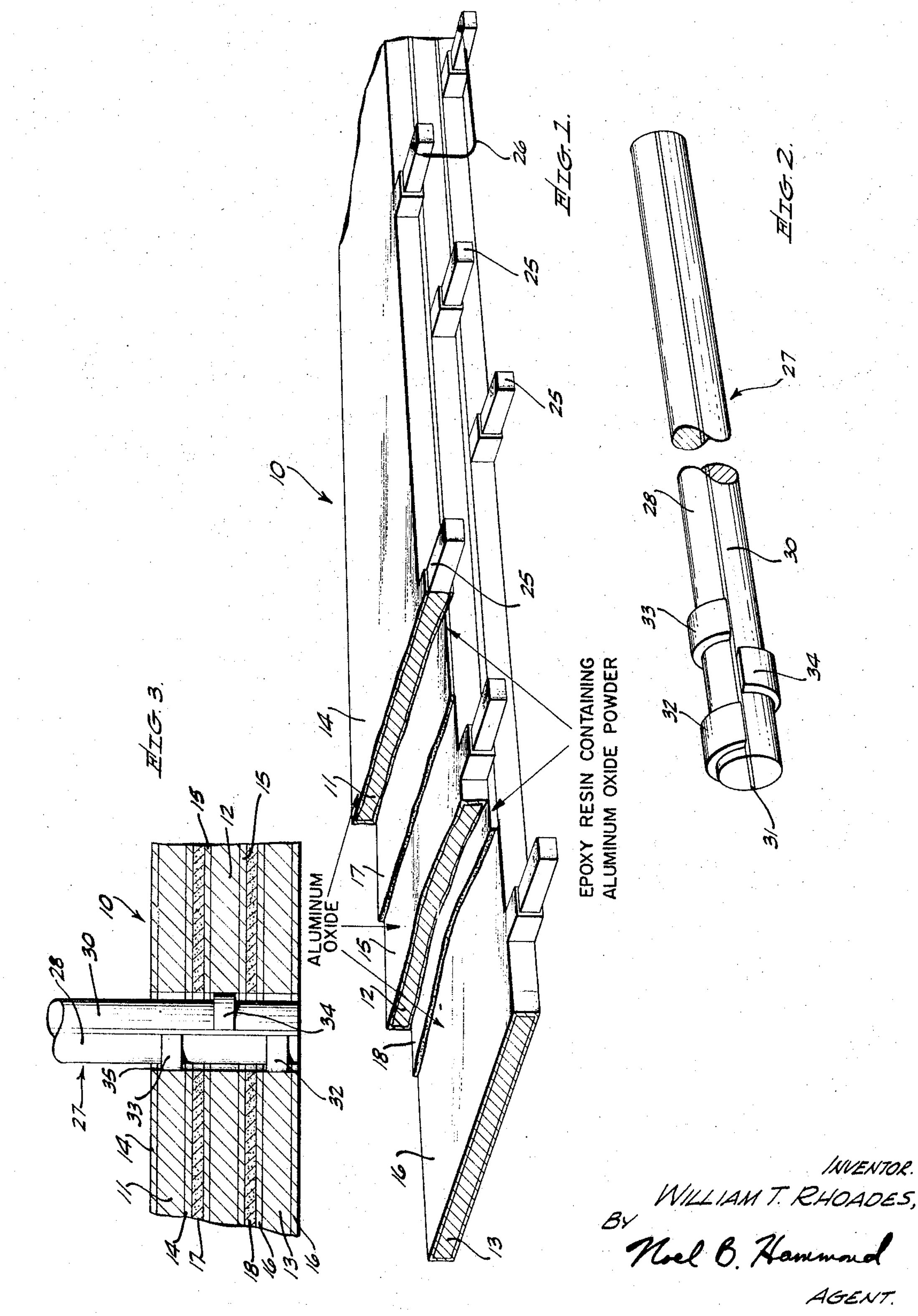
FIG. 1 is a perspective view of a section of transmission line constructed in accordance with the invention, the line being shown broken away in part.
FIG. 2 is a perspective view of a connector constructed in accordance with the invention.
FIG. 3 is a side view of the connector of FIG. 2 inserted in a mating hole in an embodiment of a transmission line in accordance with the present invention, the transmission line being shown in cross section.

Referring now to FIG. 1 of the drawings, there is shown an embodiment of a transmission line 10 in accordance with the present invention. The transmission line 10 is constructed of three conductive plates 11, 12, 13, each having thin insulating films, 14, 15, 16. The plates 11, 12, 13 are arranged with their broad surfaces substantially coextensive, parallel and adjacent to form a laminated structure. The plates 11, 12, 13 are insulated from each other by the insulating films 14, 15, 16. In the present example, the plates 11, 12, 13 are .032 inch in thickness and one inch wide. The plates 11, 12, 13 are, in the present example, made of aluminum alloy, the alloy identified as 6061–T6 having been found satisfactory. Aluminum is used because it has a low electrical resistance, is easy to machine, light in weight, has a high resistance to atmospheric corrosion and is easily insulated by anodizing. However, electrical conductors other than aluminum may be used, if desired. The inner plate 12 serves as the current path, and the two outer plates 11, 13 serve as a double current return path. Where space or weight is a factor, the two outer plates 11, 13 may be half the thickness of the inner plate 12. The transmission line 10 of the present example has a D.C. resistance of .003 ohm, which is sufficiently low to provide satisfactory D.C. transmission at a maximum current of 30 amperes.

The characteristic impedance of the transmission line 10 is made extremely low to minimize the amplitude of high frequency transient voltages developed across the transmission line 10. The characteristics impedance is made low by reducing the reactance of the transmission line 10 to a very low value. Placing the current path as close as possible to the return path reduces the effective inductance of the transmission line 10 by cancellation of the inductive field. Hence, the insulating films 14, 15, 16 are made as thin as is feasible. The insulating films 14, 15, 16 are, in the present example, formed by anodizing the plates 11, 12, 13 to a depth of .0005 inch, which provides satisfactory insulation and, at the same time, permits the plates 11, 12, 13 to be very close to each other. However, any suitable insulating coating may be employed. The dielectric breakdown voltage of the anodized films 14, 15, 16 is greater than 1,000 volts, and the insulation resistance is greater than 1,000 megohms. In addition, the anodized films 14, 15, 16 make the transmission line 10 more resistant to abrasion and corrosion.

Use of the two outer plates 11, 13 as a double return path, one on each side of the inner plate 12 employed as a current path, further reduces the inductance and, in addition, the outer plates 11, 13 serve as an electrostatic shield. In this manner, the inductance has, in some cases, been reduced to a value so low that it could not be measured, namely, below .03 nanohenry ($.03\times10^{-9}$ henry) per foot. The transmission line 10 of the present example, however, has an inductance on the order of 2 nanohenries per foot or less.

To obtain rigidity of the transmission line 10 of the present example, the plates 11, 12, 13 are bonded together by an adhesive substance 17, 18 disposed therebetween. The adhesive substance 17, 18 employed in the present example is an epoxy resin. By bonding the plates 11, 12, 13 under pressure, the spacing between the plates 11, 12, 13 is held to 0.0002 inch or less.

To decrease the capacitance reactance of the transmission line 10, the capacitance between the plates 11, 12, 13 is made as high as possible. The distance between the plates 11, 12, 13 being very small, causes the capacitance to be high and, in addition, a dielectric "loading" material is added to the adhesive substance 17, 18 between the plates 11, 12, 13. The loading material is nonmagnetic metallic particles which are mixed with the adhesive substance 17, 18 prior to bonding the plates 11, 12, 13 together. The loading material particles are approximately spherical and have a radius and separation that is small compared with the wavelength of the transient electrical signals. In this manner, the dielectric constant has been made as high as 86,000 in some cases, but with a low dielectric breakdown voltage. Accordingly, the transmission line 10 of the present example has a dielectric constant of 30, which provides a capacitance of 300,000 micromicrofarads per foot. In the present example, the material added to the adhesive substance 17, 18 is an aluminum oxide powder having a fineness on the order of 350 to 450 mesh. Aluminum oxide is particularly desirable because the oxide is an electrical insulator.

By reducing the reactance of the transmission line 10, as described above, the characteristic impedance has been reduced to very low values. In one instance, the characteristic impedance was as low as approximately .001 ohm, however, the breakdown voltage was also low, e.g. about 3 volts. The transmission line 10 of the present example has a characteristic impedance of .05 ohm. Any transient electrical signal developed across the transmission line 10 has a very low amplitude due to the low impedance.

The transmission line 10 acts as a low-pass filter, and thereby minimizes the transmission of any transient signals developed therein. By employing a dielectric loading material which is increasingly lossy as the frequency is increased, the transmission line 10 is made to behave as a low-pass filter which absorbs rather than reflects power in its stop band, and has no undesirable high-frequency passband.

If the transmission line 10 is subject to transient signals having high amplitude components in a particular frequency range, the transmission line 10 is designed to provide a high loss at those frequencies. For example, if the presence of a relatively high inductance at low frequencies is of little consequence, powdered iron may be mixed in the adhesive substance 17, 18 to provide a lossy dielectric at microwave frequencies. However, due to the high inductance when powdered iron is used, the characteristic impedance is relatively large at low frequencies.

Particle size, resistivity and permeability of the loading material affect the attenuation and determine the frequency at which the loss becomes large. Some typical metallic loading materials which have been found useful for certain applications are silver, brass, tin, copper, zinc, aluminum and stainless steel. Ferroelectric materials may also be employed. For example, barium titanate and lead zirconate produce high loss at 100 megacycles per second. The aluminum oxide powder used in the transmission line 10 of the present example provides an equivalent loss-impedance or attenuation constant of over 1,000 ohms per foot at one kilocycle-per-second, and the attenuation increases linearly with frequency.

The transmission line 10 in the embodiment of FIG. 1 is provided with a plurality of terminals 25 projecting outwardly from the edges of the conductive plates 11, 12, 13. The terminals 25 are located at regular intervals along the transmission line 10. In the present example, the circuit boards to which the transmission line 10 supplies D.C. are spaced ¾ inch apart and, accordingly, the spacing of the terminals 25 of the transmission line 10 is also ¾ inch.

To minimize the likelihood of short-circuits, the terminals 25 of each of the plates 11, 12, 13 are longitudinally displaced with respect to the terminals 25 of the other plates 11, 12, 13, so that they are staggered at ¼ inch intervals. The terminals 25 are integral with the plates 11, 12, 13, and may be produced by machining, stamping or casting at the time the plates 11, 12, 13 are formed. When the insulating films 14, 15, 16 are applied to the plates 11, 12, 13, the terminals 25 are prevented from acquiring an insulating coating, as by preventing them from entering the anodizing solution, in the case where the insulating films 14, 15, 16 are produced by anodizing. Connection from the terminals 25 to the external circuits is made by soldering wire leads to the terminals 25, using conventional aluminum solder and appropriate fluxes. The terminals 25 may also be plated with metals to which conventional lead-tin solder alloys will adhere.

At regular intervals along the transmission line 10, the top and bottom plates 11, 13 are interconnected with a wire conductor 26. This insures that the outer plates 11, 13 are at the same potential, and that there is an approximately balanced current flow in each of the outer plates 11, 13. If the current flow is not approximately balanced, the reactance of the transmission line 10 is not minimized.

In some cases, it is desirable to be able to readily make and break a connection to the transmission line 10. Accordingly, a plug-type connector 27 is provided for this purpose. The connector 27 is generally cylindrical in shape and is formed of half-sections 28, 30 having different configurations which are bonded together by an adhesive substance 31. The connector 27 is also made of the aluminum alloy identified at 6061–T6. The first half-section 28 is provided with two semicircular bosses 32, 33 near one end and spaced apart by the distance separating the outer plates 11, 13 of the transmission line 10. The second half-section 30 of the connector 27 is provided with a single semicircular boss 34 near one end and spaced half way between the two bosses 32, 33 on the other half-section 28. To form the half-sections 28, 30, two separate rods having different configurations are first made and centerless ground to the proper diameter. Following the grinding operation, the rods are split in half, and the half-section 28 of one rod is bonded to the half-section 30 of the other rod. The connector 27 is then reground to the proper diameter. In the transmission line 10 shown in FIG. 3, mating holes 35 extending transversely through the transmission line 10 are provided, instead of terminals 25, into which the connectors 27 are inserted.

Although the use of the transmission line 10 for distribution of D.C. to circuit boards in a complex electronic system makes a large improvement in the operation of the system, further improvement has been obtained by utilizing the principles of the present invention for distribution of D.C. on the circuit board itself.

Figures 4, 5, 6:
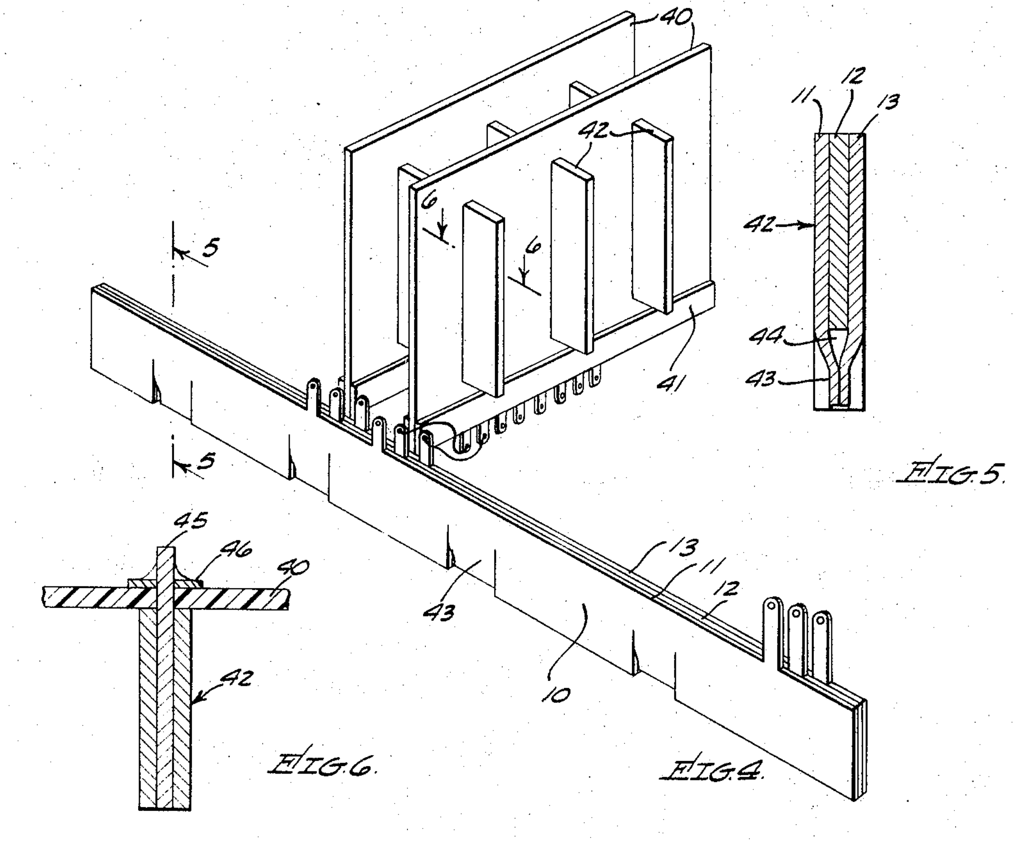
FIG. 4 is a perspective view of another embodiment of the invention, illustrating a primary transmission line connected to circuit boards incorporating secondary transmission lines.
FIG. 5 is an end view in cross section of the primary transmission line of FIG. 4 taken in the direction of the arrows 5—5.
FIG. 6 is a top view in cross section of a circuit board and secondary transmission line of FIG. 4 taken in the direction of the arrows 6—6.

Referring now to FIG. 4, a primary transmission line 10 distributes D.C. to a plurality of circuit boards 40 plugged into connectors 41. The terminals 25 of the primary transmission line 10 are connected by short lengths of wire to the connector 41 which applies the D.C. to a conductive area on the circuit board 40. The D.C. is distributed from the conductive area to the various circuits on the circuit board 40 by short secondary transmission lines 42 attached to the circuit boards 40 instead of by conventional circuit patterns.

The primary transmission line 10 has the outer plates 11, 13 electrically connected together at regular intervals by welding, as at 43, instead of by means of conductors interconnecting the terminals 25 as shown in FIG. 1. Referring to FIG. 5, the inner plate 12 is notched, as at 44, and the outer plates 11, 13 are crimped together in the notched area 44 and welded at 43.

Referring now to FIG. 6, the secondary transmission lines 42 are constructed in the same manner as the primary transmission line 10, except that they are provided with small cylindrical pin terminals 45. These pin terminals 45 are similar to the short pigtail leads provided on some conventional electronic components. The pin terminals 45 extend through holes provided in the circuit board 40 and are soldered to the conductive circuit pattern 46. The connection is located as close as possible to the electronic circuit where the D.C. is to be utilized. In this manner, the D.C. is distributed to a plurality of circuits, such as computer gate circuits, almost entirely by means of low impedance transmission lines 10, 42, thereby minimizing transient effects.

Figure 7:
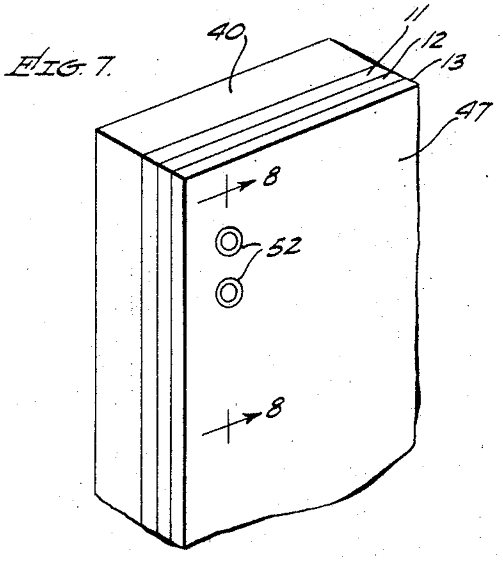
FIG. 7 is a perspective view of another embodiment of the invention, illustrating a portion of a circuit board incorporating a secondary transmission lines.
Figure 8:
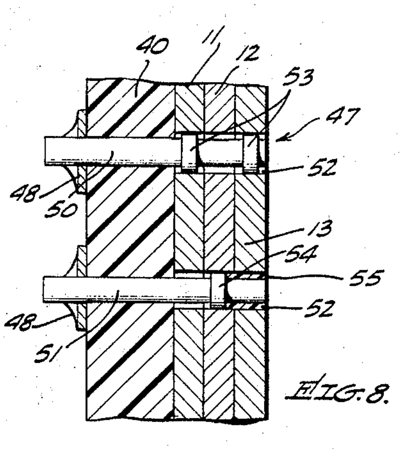
FIG. 8 is a side view in cross section of the circuit board and transmission line of FIG. 7 taken in the direction of the arrows 8—8.

In yet another embodiment of the present invention, instead of employing a plurality of secondary transmission lines 43 projecting transversely from the circuit boards 40, a single rectangular transmission line 47, of substantially the same size as the circuit board 40, is attached to the circuit board 40, as shown in FIG. 7. Connection to the circuits 48 on the circuit board 40 is made by means of two different pin connectors 50, 51 extending through holes 52 at appropriate locations, as shown in FIG. 8. The pin connector 50 for current return has two annular bosses 53 disposed at the proper locations to make contact with the outer layers 11, 13 of the transmission line 47. The other pin connector 51 for current supply is provided with a single annular boss 54 located to make contact with the inner plate 12 of the transmission line 47. A flexible insulating sleeve 55 which may be made of polyethylene or nylon, for example, is provided at the outer end of the pin connector 51 to permit a snug fit into the outer plate 13 while at the same time providing insulation of the pin connector 51 therefrom. The pin connectors 50, 51 are soldered to the circuits 48 on the circuit board 40. The pin connectors 50, 51 may be welded to the transmission line 47 after assembly by passing a suitably high current therethrough for a short time or by rotary welding methods, in which the pin connectors 50, 51 are rapidly spun to produce frictional heating.

It has been found that in computers using conventional wiring instead of the transmission lines of the present invention, the speed of the gate circuits is in the range of 500–1000 nanoseconds (.5–1 microsecond). When a transmission line 10 is used to distribute power to the circuit boards 40, as indicated in FIG. 4, the speed of the gates is approximately 20 nanoseconds, and when the power is distributed on the circuit board 40 by a rectangular transmission line 47, as indicated in FIGS. 7 and 8, the speed of the gates is on the order of one nanosecond. This improvement is due to the substantially complete elimination of the transient fluctuations in the supply voltages.

Where several different D.C. voltages are to be supplied, the transmission line may be made in multiple layers, each layer or each alternate layer providing a different voltage.

For applications employing cryogenic circuitry and/or transducers such as ferroelectric transducers where it is necessary to provide a transmission line which matches a specific low value of characteristic impedance, for example .25 ohm, the impedance of the transmission line 10 may be raised to the required value during manufacture by increasing the spacing between the plates 11, 12, 13, or by varying the dielectric constant between the plates 11, 12, 13 in accordance with conventional transmission line theory.

Thus, there has been described an electrical transmission system which minimizes the transmission of transient electrical fluctuations and which provides extremely low impedance.

While several embodiments of the invention have been shown and described, other variations may be made, and it is intended that the foregoing disclosure shall be considered only as illustrative of the principles of the invention and not construed in a limiting sense.

What is claimed is:

1. An electrical transmission system comprising:

(a) three conductive plates having an insulating film on the outer surfaces thereof, said plates being disposed with the board surfaces thereof substantially coextensive, parallel and adjacent to form a laminated structure, said plates being electrically insulated from each other by said insulating film;

(b) an adhesive substance disposed between said plates and uniting said plates together; and (c) means electrically interconnecting the outer two of said plates at regular intervals along the length thereof, the inner one of said plates forming a current path for the transmission of direct current and the outer two of said plates forming a double return path for said direct current.

2. An electrical transmission system comprising:
(a) three plates of aluminum alloy, the outer surfaces thereof being anodized to a depth of at least substantially .0005 inch, said plates being disposed with the broad surfaces thereof substantially coextensive, parallel and adjacent to form a laminated structure, said plates being electrically insulated from each other by the anodized surfaces thereof, the inner one of said plates forming a current path for the transmission of direct current and the outer two of said plates forming a double return path for said direct current;
(b) means electrically interconnecting the outer two of said plates at regular intervals along the length thereof;
(c) an adhesive substance disposed between said plates and uniting said plates together, said adhesive substance containing aluminum oxide powder for providing a predetermined dielectric constant and a predetermined high-frequency loss characteristic;
(d) said three plates having a hole extending transversely therethrough to receive a connector;
(e) and a generally cylindrical connector disposed in said hole having means electrically connected to a selected one of said plates within said hole.

3. An electrical transmission system comprising:
(a) three plates of aluminum alloy, the outer surfaces thereof being anodized to a depth of at least substantially .0005 inch, said plates being disposed with the broad surfaces thereof substantially coextensive, parallel and adjacent to form a laminated structure, said plates being electrically insulated from each other by the anodized surfaces thereof, the inner one of said plates forming a current path for the transmission of direct current and the outer two of said plates forming a double return path for said direct current;
(b) a plurality of terminals projecting outward from the edges of said plates at regular intervals for making connections from said plates to external electronic circuits, the terminals of each of said plates being longitudinally displaced with respect to the terminals of each other of said plates;
(c) a plurality of conductors electrically interconnecting the outer two of said plates at regular intervals along the length thereof;
(d) an adhesive substance disposed between said plates and uniting said plates together, said adhesive substance containing aluminum oxide powder for providing a predetermined dielectric constant and a predetermined high-frequency loss characteristic;
(e) said three plates having a hole extending transversely therethrough to receive a connector;
(f) and a generally cylindrical connector disposed in said hole and formed of longitudinal halves united together by an insulating adhesive substance, one-half of said connector having a semicircular boss engaging the inner one of said plates, the other half of said connector having two semicircular bosses engaging the outer two of said plates.

4. An electrical transmission system comprising:
(a) a circuit board including an insulating base, a conductive circuit pattern disposed on said base, and a thin, flat laminated transmission line disposed on said base;
(b) said transmission line comprising three conductive plates having an insulating film on the outer surfaces thereof, said plates being disposed with the broad surfaces thereof substantially coextensive, parallel and adjacent to form a laminated structure, said plates being united together by an adhesive substance disposed therebetween;
(c) and means electrically connecting said transmission line to the conductive circuit pattern on said circuit board.

5. An electrical transmission system comprising:
(a) a circuit board including an insulating base, a conductve circuit pattern disposed on said base, and a thin, flat laminated transmission line disposed on said base;
(b) said transmission line comprising three plates of aluminum alloy, the outer surfaces thereof being anodized to a depth of at least substantially .0005 inch, said plates being disposed with the broad surfaces thereof substantially coextensive, parallel and adjacent to form a laminated structure, said plates being electrically insulated from each other by the anodized surfaces thereof, the inner one of said plates forming a current path for the transmission of direct current and the outer two of said plates forming a double return path for said direct current, said plates being united together by an adhesive substance disposed therebetween, said adhesive substance containing aluminum oxide powder for providing a predetermined dielectric constant and a predetermined high-frequency loss characteristic;
(c) and means electrically connecting said transmission line to the conductive circuit pattern on said circuit board.

6. An electrical transmission system comprising:
(a) a circuit board including an insulating base, a conductive circuit pattern disposed on said base, and a thin, flat laminated transmission line disposed on said base with the broad surfaces of said transmission line perpendicular to the broad surfaces of said base, said circuit board having a plurality of holes extending through said insulating base and said circuit pattern;
(b) said transmission line comprising three conductive plates having an insulating film on the outer surfaces thereof, said plates being disposed with the broad surfaces thereof substantially coextensive, parallel and adjacent to form a laminated structure, said plates being united together by an adhesive substance disposed therebetween;
(c) and a plurality of wire-like leads extending from the edges of said transmision line adjacent said insulating base, said leads being integral with said plates and extending through said holes and being soldered to the conductive circuit pattern on said circuit board.

7. An electrical transmission system comprising:
(a) a circuit board including an insulating base, a conductive circuit pattern disposed on said base, and a thin, flat laminated transmission line disposed on said base with the broad surfaces of said transmission line perpendicular to the broad surfaces of said base, said circuit board having a plurality of holes extending through said insulating base and said circuit pattern;
(b) said transmission line comprising three plates of aluminum alloy, the outer surfaces thereof being anodized to a depth of at least substantially .0005 inch, said plates being disposed with the broad surfaces thereof substantially coextensive, parallel and adjacent to form a laminated structure, said plates being electrically insulated from each other by the anodized surfaces thereof, the inner one of said plates forming a current path for the transmission of direct current and the outer two of said plates forming a double return path for said direct current, said plates being united together by an adhesive substance disposed therebetween, said adhesive substance containing aluminum oxide powder for providing a predetermined dielectric constant and a predetermined high-frequency loss characteristic;
(c) and a plurality of wire-like leads extending from the edges of said transmission line adjacent said insulating base, said leads being integral with said plates and extending through said holes and being soldered to the conductive circuit pattern on said circuit board.

8. An electrical transmission system comprising:

(a) a circuit board including an insulating base, a conductive circuit pattern disposed on said base, and a thin, laminated transmission line disposed on said base with a broad surface of said transmission line parallel and adjacent to a broad surface of said base, said circuit board having a plurality of holes extending through said insulating base, said circuit pattern and said transmission line;

(b) said transmission line comprising three conductive plates having an insulating film on the outer surfaces thereof, said plates being disposed with the broad surfaces thereof substantially coextensive, parallel and adjacent to form a laminated structure, said plates being united together by an adhesive substance disposed therebetween;

(c) and a plurality of connection pins extending through said holes in said circuit board, said connection pins having means near one end thereof electrically connected to a selected one of said plates within said holes, the other end of said connection pins being soldered to the conductive circuit pattern on said circuit board.

9. An electrical transmission system comprising:

(a) a circuit board including an insulating base, a conductive circuit pattern disposed on one side of said base, and a rectangular, thin, flat laminated transmission line disposed on the other side of said base with a broad surface of said transmission line parallel and adjacent to the broad surface of said base, said circuit board having a plurality of holes extending through said insulating base, said circuit pattern and said rectangular transmission line;

(b) said transmission line comprising three plates of aluminum alloy, the outer surfaces thereof being anodized to a depth of at least substantially .0005 inch, said plates being disposed with the broad surfaces thereof substantially coextensive, parallel and adjacent to form a laminated structure, said plates being electrically insulated from each other by the anodized surfaces thereof, the inner one of said plates forming a current path for the transmission of direct current and the outer two of said plates forming a double return path for said direct current, said plates being separated by an adhesive substance disposed between said plates and uniting said plates together, said adhesive substance containing aluminum oxide powder for providing a predetermined dielectric constant and a predetermined high-frequency loss characteristic;

(c) and a plurality of connection pins extending through said holes in said circuit board, said connection pins having means near one end thereof electrically connected to selected ones of said plates within said holes, the other end of said connection pins being soldered to the conductive circuit pattern on said circuit board.

10. An electrical transmission system comprising:

(a) a circuit board including an insulating base, a conductive circuit pattern disposed on one side of said base, and a thin, laminated transmission line disposed on the other side of said base with a broad surface of said transmission line parallel and adjacent to the broad surface of said base, said circuit board having a plurality of holes extending through said insulating base, said circuit pattern and said transmission line;

(b) said transmission line comprising three conductive plates having an insulating film on the outer surfaces thereof, said plates being disposed with the broad surfaces thereof substantially coextensive, parallel and adjacent to form a laminated structure, said plates being united together by an adhesive substance disposed therebetween;

(c) at least two inner layer connection pins extending through selected ones of said holes in said circuit board, said inner layer connection pins having a boss near one end thereof electrically connected to the inner one of said plates within said holes, the other end of said inner layer connection pins being soldered to the conductive circuit pattern on said circuit board;

(d) and at least two outer layer connection pins extending through selected ones of said holes in said circuit board, said outer layer connection pins having two separated bosses near one end thereof electrically connected to the outer two of said plates within said holes, the other end of said outer layer connection pins being soldered to the conductive circuit pattern on said circuit board.

11. An electrical transmission system comprising:

(a) a circuit board including an insulating base, a conductive circuit pattern disposed on one side of said base, and a rectangular, thin, flat laminated transmission line disposed on the other side of said base with a broad surface of said transmission line parallel and adjacent to the broad surface of said base, said circuit board having a plurality of holes extending through said insulating base, said circuit pattern and said rectangular transmission line;

(b) said transmission line comprising three plates of aluminum alloy, the outer surfaces thereof being anodized to a depth of at least substantially .0005 inch, said plates being disposed with the broad surfaces thereof substantially coextensive, parallel and adjacent to form a laminated structure, said plates being electrically insulated from each other by the anodized surfaces thereof, the inner one of said plates forming a current path for the transmission of direct current and the outer two of said plates forming a double return path for said direct current, said plates being separated by an adhesive substance disposed between said plates and uniting said plates together, said adhesive substance containing aluminum oxide powder for providing a predetermined dielectric constant and a predetermined high-frequency loss characteristic;

(c) at least two current supply pins extending through selected ones of said holes in said circuit board, said current supply pins having a boss near one end thereof electrically connected to the inner one of said plates within said holes, the other end of said current supply pins being soldered to the conductive circuit pattern on said circuit board;

(d) and at least two current return pins extending through selected ones of said holes in said circuit board, said current return pins having two separated bosses near one end thereof electrically connected to the outer two of said plates within said holes, the other end of said current return pins being soldered to the conductive circuit pattern on said circuit board.

12. An electrical transmission system comprising:

(a) a first thin, flat laminated three-layer transmission line having terminals projecting outward from one edge thereof and having the outer two of said layers electrically interconnected at regular intervals along the length thereof;

(b) a circuit board disposed adjacent said first transmission line, said circuit board including an insulating base, a conductive circuit pattern disposed on said base, and a second thin, flat laminated transmission line disposed on said base;

(c) means connecting said terminals of said first transmission line to portions of said circuit pattern on said circuit board;

(d) said transmission lines comprising three conductive plates having an insulating film on the outer surfaces thereof, said plates being disposed with the broad surfaces thereof substantially coextensive, parallel and adjacent to form a laminated structure, said plates being united together by an adhesive substance disposed therebetween;

(e) and means electrically interconnecting said second transmission line to the conductive circuit pattern on said circuit board.

13. An electrical transmission system comprising:

(a) a first thin, flat laminated three-layer transmission line having terminals projecting outward from one edge thereof and having the outer two of said layers electrically interconnected at regular intervals along the length thereof;

(b) a circuit board disposed adjacent said first transmission line, said circuit board including an insulating base, a conductive circuit pattern disposed on said base, and a second thin, flat laminated transmission line disposed on said base with the broad surfaces of said second transmission line perpendicular to the broad surfaces of said base, said circuit board having a plurality of holes extending through said insulating base and said circuit pattern;

(c) means connecting said terminals of said first transmission line to portions of said circuit pattern on said circuit board;

(d) said first and second transmission line each comprising three conductive plates having an insulating film on the outer surfaces thereof, said plates being disposed with the broad surfaces thereof substantially coextensive, parallel and adjacent to form a laminated structure, said plates being united together by an adhesive substance disposed therebetween;

(e) and a plurality of wire-like leads extending from the edges of said second transmission line adjacent said insulating base, said leads being integral with said plates and extending through and being soldered to the conductive circuit pattern on said circuit board.

14. An electrical transmission system comprising:

(a) a first thin, flat laminated three-layer transmission line having terminals projecting outward from one edge thereof and having the outer two of said layers electrically interconnected at regular intervals along the length thereof;

(b) a circuit board disposed adjacent said first transmission line, said circuit board including an insulating base, a conductive circuit pattern disposed on said base, and a second thin, flat laminated transmission line disposed on said base with a broad surface of said second transmission line parallel and adjacent to a broad surface of said base, said circuit board having a plurality of holes extending through said insulating base, said circuit pattern and said second transmission line;

(c) means connecting said terminals of said first transmission line to portions of said circuit pattern on said circuit board;

(d) said first and second transmission line each comprising three conductive plates having an insulating film on the outer surfaces thereof, said plates being disposed with the broad surfaces thereof substantially coextensive, parallel and adjacent to form a laminated structure, said plates being united together by an adhesive substance disposed therebetween;

(e) and a plurality of connection pins extending through said holes in said circuit board, said connection pins having means near one end thereof electrically connected to selected ones of said plates within said holes in said second transmission line, the other end of said connection pins being soldered to the conductive circuit pattern on said circuit board.

15. An electrical transmission system comprising:

(a) a first thin, flat laminated three-layer transmission line having terminals projecting outward from one edge thereof and having the outer two of said layers electrically interconnected at regular intervals along the length thereof;

(b) a circuit board disposed adjacent said first transmission line, said circuit board including an insulating base, a conductive circuit pattern disposed on said base, and a second thin, flat laminated transmission line disposed on said base with a broad surface of said second transmission line parallel and adjacent to a broad surface of said base, said circuit board having a plurality of holes extending through said insulating base, said circuit pattern and said second transmission line;

(c) means connecting said terminals of said first transmission line to portions of said circuit pattern on said circuit board;

(d) said first and second transmission line each comprising three plates of aluminum alloy, the outer surfaces thereof being anodized to a depth of at least substantially .0005 inch, said plates being disposed with the broad surfaces thereof substantially coextensive, parallel and adjacent to form a laminated structure, said plates being electrically insulated from each other by the anodized surfaces thereof, the inner one of said plates forming a current path for the transmission of direct current and the outer two of said plates forming a double return path for said direct current, said plates being united together by an adhesive substance disposed therebetween, said adhesive substance containing aluminum oxide powder for providing a predetermined dielectric constant and a predetermined high-frequency loss characteristic;

(e) and a plurality of connection pins extending through said holes in said circuit board, said connection pins having means near one end thereof electrically connected to selected ones of said plates within said holes in said second transmission line, the other end of said connection pins being soldered to the conductive circuit pattern on said circuit board.

References Cited by the Examiner

UNITED STATES PATENTS 1,999,137 4/1935 Flewelling.

LEWIS H. MYERS, *Primary Examiner.*

D. L. CLAY, *Assistant Examiner.*